Nov. 24, 1953  J. A. LABOUYGUES  2,660,305
CLASSIFIER FOR SOLID BODIES CARRIED IN A FLUID STREAM
Filed Oct. 26, 1949

INVENTOR
JEAN ANTOINE LABOUYGUES
By Haseltine, Lake & Co.
ATTORNEYS

Patented Nov. 24, 1953

2,660,305

UNITED STATES PATENT OFFICE 2,660,305

CLASSIFIER FOR SOLID BODIES CARRIED IN A FLUID STREAM

Jean Antoine Labouygues, Messeix, France

Application October 26, 1949, Serial No. 123,674
In France November 3, 1943

Section 1, Public Law 690, August 8, 1946
Patent expires November 3, 1963

3 Claims. (Cl. 209—155)

The present invention relates to the classification according to their densities and the separation of solid bodies carried by a stream of fluid. This application is a continuation in part of my co-pending patent application Serial No. 590,810, filed April 28, 1945, entitled Classifier for Solid Bodies Carried in a Fluid Stream, which has become abandoned.

It is a primary object of this invention to provide an improved fluid classifier runway or spout construction to facilitate the lamellar separation of solid bodies carried in a stream of fluid moving therein.

The invention in its basic aspects provides for an improved apparatus for classifying solid materials according to their ranging densities, wherein the materials are conveyed by a fluid stream in a channel-shaped runway, the side walls of the channel converging in the direction of the fluid flow to end in a spout having the shape of a vertical, lamellar slot, and the bottom wall being curved downward in the direction of fluid flow whereby the fluid and materials issuing from the slot are arranged as a free vertical lamellate jet for separation into groups of different densities.

Another object of the invention is to provide a classifier as aforesaid wherein the sorting effect is obtained by a vertical gravitational classification of the bodies carried by a lamellar jet of fluid.

A further object of the invention is to provide a fluid spout classifier as aforesaid wherein the sorting effect is advantageously completed by deflecting blades arranged across the lamellar jet of fluid delivered through the spout-like slot of this invention.

With these and such other objects in view as will incidentally appear hereafter, the invention comprises the novel construction and arrangement of parts that will now be described with reference to the accompanying diagrammatic drawing exemplifying the same and forming a part of the present disclosure.

Figure 1:
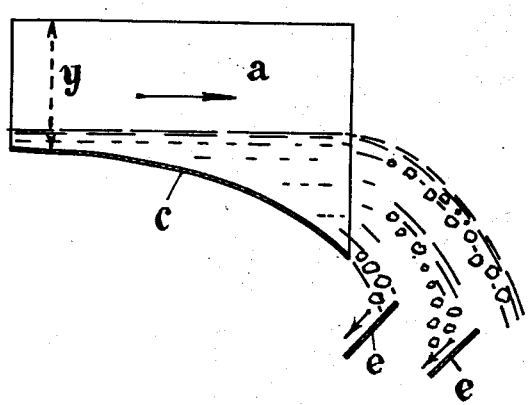
Figure 1 is a longitudinal sectional view on the line A—A of Fig. 2 of the classifier.
Figure 2:
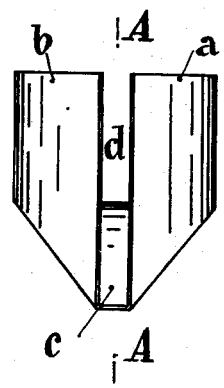
Figure 2 is an end view thereof looking into the vertical slot through which the fluid flows out in jet form.

Various types of apparatus for the classification of solid bodies in a fluid stream are known in the prior art. I have found that none of the prior art constructions are suitable to effectively classify very small or fine solid particles according to their ranging densities when the range of specific gravities may be quite small, such as 1.25 to 1.6 for commercial coal, 1.6 to 1.8 for middlings, and 1.8 to 2.3 for shale or refuse. I have found after extensive experimentation and research that a fluid spout having a downwardly curved bottom in the direction of fluid flow effectively serves to keep even the tiniest particles of the heaviest solids in the lamellar stream next to the bottom surface of the spout. This advantageous action is believed to be a consequence of the lower forward speed of fluid flow in the lamellar fluid next to the bottom surface in comparison to the higher forward speed of fluid flow for the lamellar fluid at the top of the fluid in the spout. The differential fluid speeds referred to are believed to be due entirely to the shape of the spout of this invention providing for the converging side walls and in particular the downwardly curving bottom wall in the direction of the fluid flow. Furthermore, the downwardly curving bottom wall provides for the forward movement of the fluid stream with a minimum of disturbances and eddies and enables the differential acceleration of fluid flow with a minimum volume of fluid in proportion to the volume of solids to be classified. For example, with the classifying spout of this invention, one volume of washing water to one volume of coal will provide effective classification where the typical particle size of the coal may not be larger than .20 inch in diameter. It is to be noted that, when classifying and separating very fine solids of closely similar specific gravities, it is absolutely necessary to obtain the lamellar fluid jet by apparatus functioning with a minimum of disturbance to the fluid flow. In all of the prior forms of lamellar fluid spouts of which I am aware the conventional flat bottom wall caused a brute force acceleration of the fluid flow producing eddies and whirlpools together with high forward fluid speeds in the lamellar regions of the heaviest particles adjacent the bottom wall and thus effective classification of small particles in a small range of specific gravities could not be obtained. From the foregoing, it will be seen that this invention teaches that a freely flowing stream with a minimum of disturbances together with a range of differential forward fluid speeds varying from a minimum forward speed for the fluid at the bottom of the runway or spout to a maximum forward speed for the fluid at the top of the spout is necessary in order to effectively classify the solids of the character referred to conveyed therein.

As shown in the drawing, the classifier is built in the form of a chute or spout from which the fluid carrying the solid bodies to be separated is poured into the open air. This chute has side walls $a$, $b$ which converge and a bottom $c$ which curves downward in the direction of fluid flow so as to cause the fluid jet to come out through a vertical spout-like slot $d$. To that effect, the width $x$ of the chute gradually diminishes from the inlet to the outlet of the stream of fluid carrying the bodies or substances to be separated as the depth $y$ of said chute gradually increases due to the curving outline of its bottom $c$.

For each selected application of the classifier as called for by industrial uses, the values of $(x)$ and $(y)$ are co-related by such an algebraic relationship as will take into account the rate of delivery of the chute and spout and the desired differential speeds of the fluid at each lamellar region. The purpose of such relationship as previously described is to insure an optimum classifying effect according to density.

It is known, moreover, that in any fluid conveying apparatus, the substances form a bed which is often very thin and substantially parallel to the bottom of the conveyor. In proportion as such substances move through the apparatus, according to this invention, the bed of solids grows thicker while becoming narrower. The heavier solid constituents glide toward the bottom of the classifier while the lighter constituents remain on the surface of the fluid. The relationship between the values of $x$ and $y$ permits a layer or stratum without apparent eddies to be obtained in the fluid jet. Thus in particular, the upper surface of the bed remains substantially parallel with the initial surface at the inlet of the classifier. Any lump of the carried substance has a tendency to follow a special path according to its own density. Thus, it reaches without any impact or disturbance the spout-like extremity of the chute.

In order to obtain the separation of the solid mixture into one or more groups, one or more of the deflector blades $e$ may be interposed across the lamellar jet at varying spaced distances from the jet end of the spout. The exact orientations or positions of the deflector blades across the fluid jet may be adjusted to suit requirements either by manual control or by automatic control responsive to variations in the delivery of the liquid flow.

The classifier may be made of any suitable material and may be arranged on any stationary or vibrating chute through which the solid substances travel either by gravitational action or owing to a flow of fluid in any proportions with respect to the quantity of solid substances. Alternatively, the classifier may be arranged on certain movable conveying appliances such as jigging conveyors or sieves.

The classifier may be used, for example, for:

(a) The treatment of raw coals—riddled or calibrated coal, dust coal or "fines," coal slimes or washings (slimes do not require a preliminary concentration);

(b) The separation of finished products into two or more commercial categories, for example, a product of high purity and products of average quality;

(c) The reclaiming of coals and mixed constituents in shales at the outlet end of lixiviating appliances;

(d) The reclaiming of coals in dumps where the plants are of coarse structure;

(e) The separation of solid products having different densities such as ores, earths, grains, etc.

A classifier built as above described presents the following advantages:

(a) Its manufacturing cost is extremely low.

(b) It can be interposed with the utmost ease as a single or multiple unit into an existing plant.

(c) Its overall volume is relatively small.

(d) It permits an almost instantaneous separation of the bodies, since the duration of the passing of the substances being treated is equal to about one second.

(e) It can cope with a wide granulometric range.

(f) It accommodates itself of the most widely different rates of delivery and in particular gives very good results in connection with a strong water current containing a very small quantity of solid materials in suspension. In other words, it is not the classifier which determines the rate of delivery of the fluid as in most known plants but, on the contrary, this improved classifier can always cope with pre-existing rates of delivery.

Figure 3:
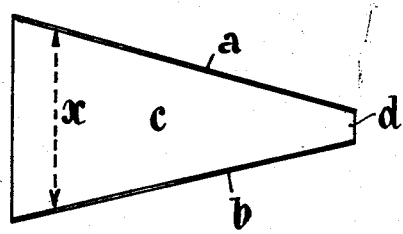
Figure 3 is a plan view of the classifier.
Figure 4:
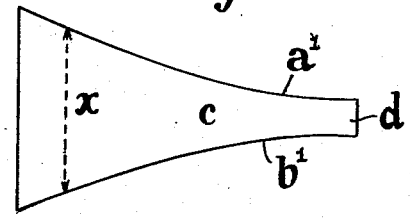
Figure 4 is a plan view of a modification of the shape of the classifier similar to Fig. 3.

While in a normal constructional form, the side walls $a$, $b$ of the chute may be rectilinear as in Fig. 3, a possible modification is shown by the lines $a^1$, $b^1$ in Fig. 4 where such walls have inwardly curved outlines.

Minor constructional details might be varied without departing from the scope of the subjoined claims.

I claim:

1. In apparatus for classifying solid materials according to their ranging densities, wherein the materials are conveyed by a fluid stream in a channel-shaped runway, the side walls of the channel converging in the direction of the stream to end in a spout having the shape of a vertical, lamellar, substantially rectangular slot, whereby the fluid and materials issuing from the slot are arranged as a free, vertical, lamellate jet, the provision of a bottom wall to the runway having an increasing downward inclination in the direction of the stream to produce a range of forward flow speeds for the lamellar jet varying from a maximum speed for the upper lamellar flow to a minimum speed for the lowest lamellar flow.

2. In apparatus for classifying and separating solid materials according to their ranging densities, wherein the materials are conveyed by a fluid stream in a channel-shaped runway, the side walls of the channel converging in the direction of the stream to end in a spout having the shape of a vertical, lamellar, substantially rectangular slot, whereby the fluid and materials issuing from the slot are arranged as a free, vertical, lamellate jet, the provision of a bottom wall to the runway having an increasing downward inclination in the direction of the stream to produce a range of forward flow speeds for the lamellar jet varying from a maximum speed for the upper lamellar flow to a minimum speed for the lowest lameller flow, and means for parting the layers of different densities formed by the materials in the free jet, said means comprising adjustably inclinable deflectors arranged in the jet and spaced from and below the jet extremity of the runway.

3. In apparatus for classifying solid materials according to their ranging densities, wherein the materials are conveyed by a fluid stream in a channel-shaped runway, the side walls of the channel being curved inward toward each other and converging in the direction of the stream to end in a spout having the shape of a vertical, lamellar, substantially rectangular slot, whereby the fluid and materials issuing from the slot are arranged as a free, vertical, lamellate jet, the provision of a bottom wall to the runway having an increasing downward inclination in the direction of the stream to produce a range of forward flow speeds for the lamellar jet varying from a maximum speed for the upper lamellar flow to a minimum speed for the lowest lamellar flow.

JEAN ANTOINE LABOUYGUES.

References Cited in the file of this patent

UNITED STATES PATENTS

| Number | Name | Date |
|---|---|---|
| 800,293 | Hague | Sept. 26, 1905 |
| 1,294,603 | Becott | Feb. 18, 1919 |
| 1,811,408 | Stebbins | June 23, 1931 |
| 2,171,674 | Schifferle | Sept. 5, 1939 |
| 2,362,130 | Glenn | Nov. 7, 1944 |

FOREIGN PATENTS

| Number | Country | Date |
|---|---|---|
| 486,112 | France | Mar. 12, 1918 |
| 985,462 | France | Nov. 3, 1943 |